United States Patent [19]

Mewes et al.

[11] 3,932,275
[45] Jan. 13, 1976

[54] PROCESS FOR THE TREATMENT OF MINERAL SLIMES

[75] Inventors: Arthur Raymond Mewes, Dayton, Ohio; Robert W. Styron, Atlanta; Mark Harris Smith, Woodstock, both of Ga.

[73] Assignee: AMAX Resource Recovery Systems, Inc., Dayton, Ohio

[22] Filed: Aug. 29, 1974

[21] Appl. No.: 501,620

[52] U.S. Cl. .................................. 210/49; 210/53
[51] Int. Cl.$^2$ .................................................. C02B 1/20
[58] Field of Search ............ 210/51, 52, 53, 54, 49; 423/321, 321 S

[56] References Cited
UNITED STATES PATENTS

| | | | |
|---|---|---|---|
| 3,226,319 | 12/1965 | Schick | 210/53 |
| 3,338,828 | 8/1967 | Clark | 210/54 |
| 3,350,302 | 10/1967 | Demeter | 210/51 |
| 3,388,060 | 6/1968 | Clark | 210/54 |
| 3,446,731 | 5/1969 | Harsh | 210/53 |

Primary Examiner—Thomas G. Wyse
Assistant Examiner—Ernest G. Therkorn
Attorney, Agent, or Firm—Biebel, French & Bugg

[57] ABSTRACT

A method of dewatering mineral slimes by adding fly ash and then a polyelectrolyte and blending slowly and thoroughly. The clear water supernatant may be drawn off from the sedimented coagulated solids. The coagulated solids may be further dewatered or treated in ecologically beneficial ways.

4 Claims, 3 Drawing Figures

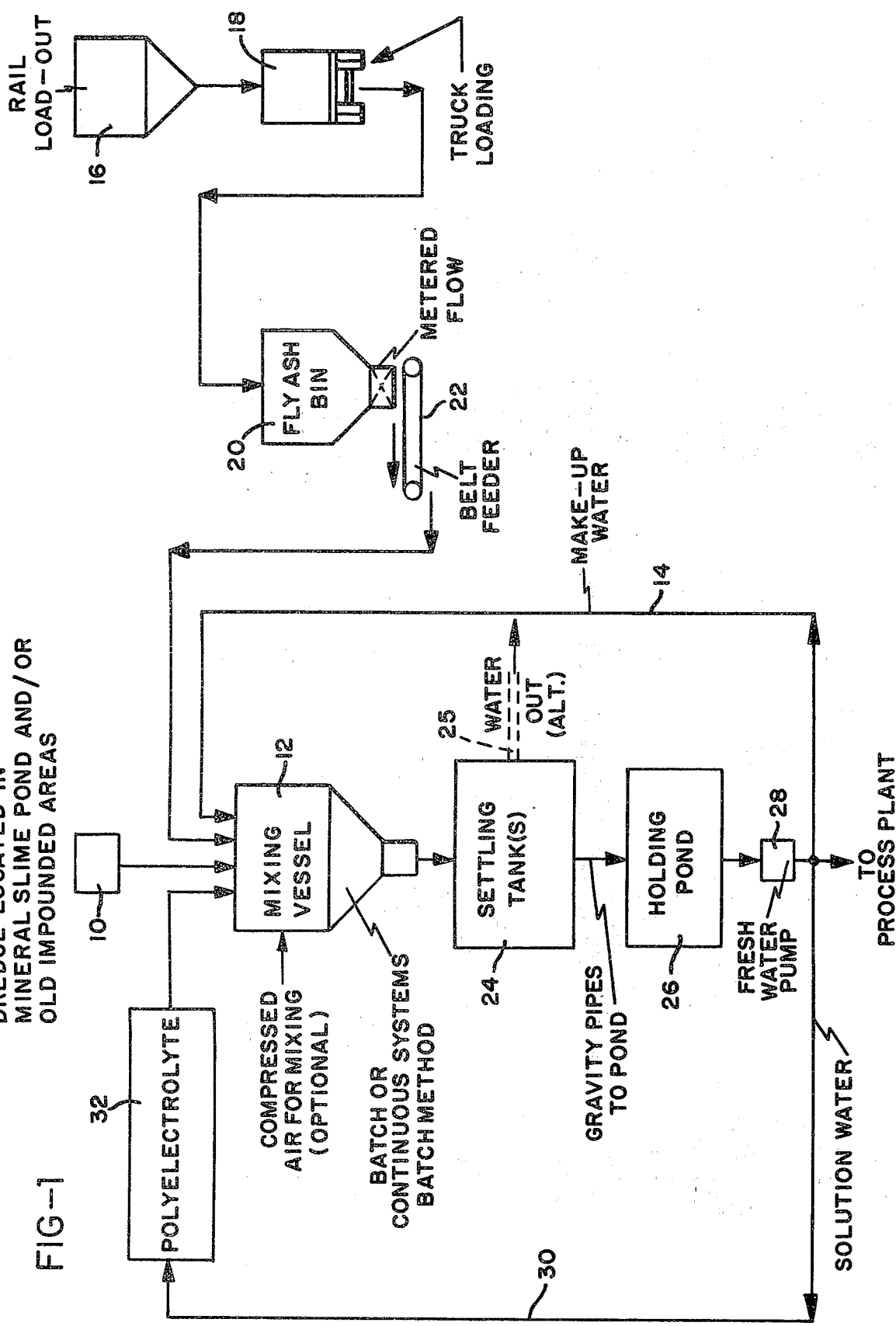

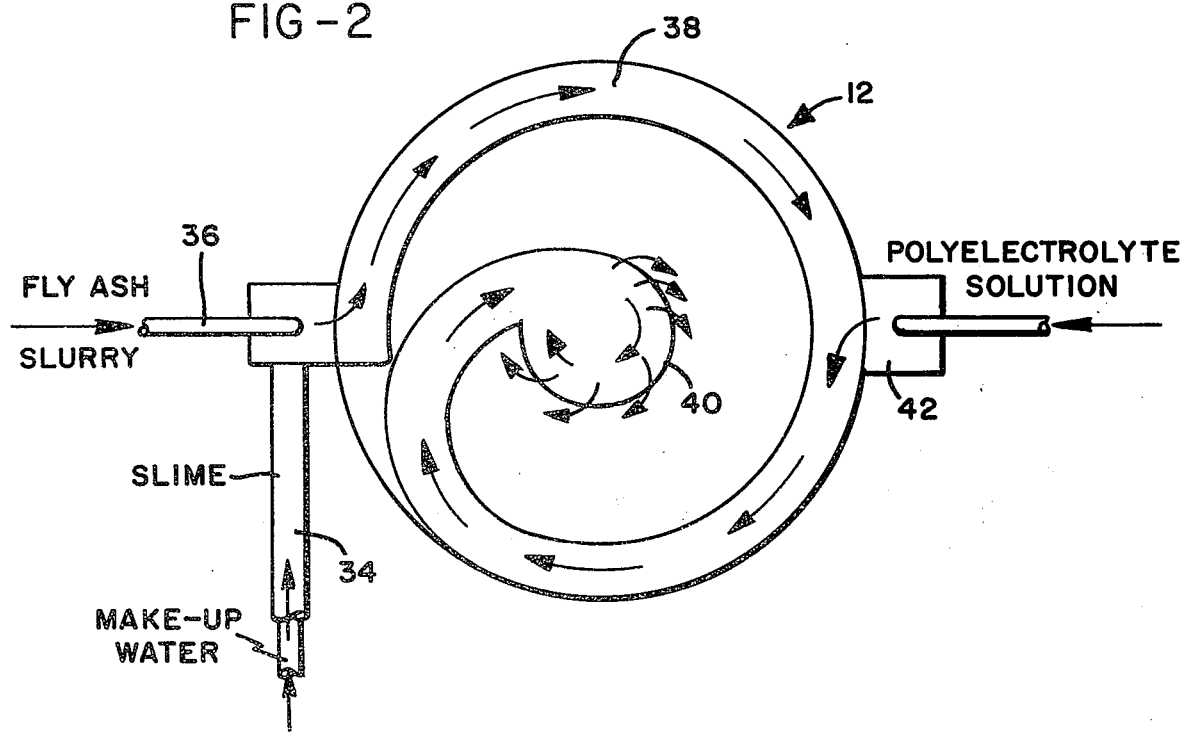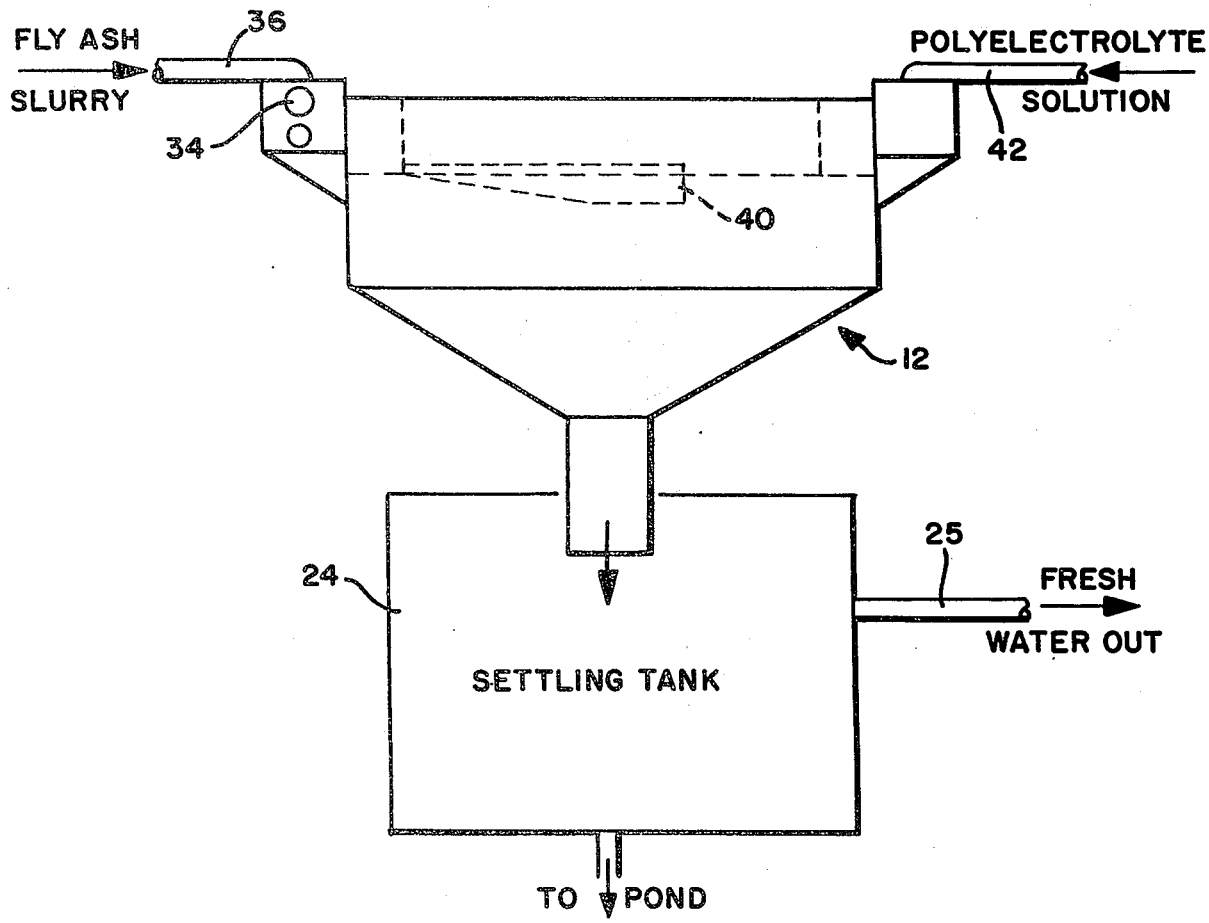

PROCESS FOR THE TREATMENT OF MINERAL SLIMES

BACKGROUND OF THE INVENTION

This invention relates to a process for settling colloidal-type suspensions and, more particularly, to a method for coagulating mineral slimes with fly ash and a polyelectrolyte as an effective means of waste disposal for both the slimes and the fly ash.

In a number of mining industries such as copper, iron (taconite), potash, phosphate, etc., waste products from the processing present serious disposal problems. For example, in the phosphate industry processing leads to about one-third recoverable phosphate rock, one-third sand tailings and one-third fines of generally less than 150 mesh particle size. Slimes are an aqueous suspension of these ultrafine soil solids which are associated with the ore and which are put into solution during the processing. Thus, phosphate slimes from a benefication plant contain approximately 5% solids and, as such, represent 150% the volume of the processed material.

In the central area of the State of Florida, where a large portion of the U.S. phosphate mining industry exists, the problem of disposal of slimes has become a major problem. At present, the slimes are contained in ponds or impounded areas surrounded by earthen dams. There the slimes are allowed to settle by gravity. However, this process takes a number of years, usually over ten, to form a 20% solids concentration. In the meantime, the land covered by the pond is lost for any useful purpose and often covers over rapidly with a plant-algae growth. In addition the dams must be maintained continuously since dam failures result in pollution of neighboring lands and waters. Also, the fresh water taken out of use by being tied-up in the slime pools presents a problem since available fresh water is in short supply in Central Florida.

Mineral slimes exhibit colloid-like properties that are believed to be largely responsible for their poor dewatering characteristics. That is to say they comprise very fine colloid-like particles suspended in water which results largely from montmorillonite and attapulgite content. Attapulgite and montmorillonite together are known to comprise approximately one-third of the slime composition. These materials are also well known for their colloid-like behavior when exposed to water. They tend to absorb water or to link with water and form a suspended material.

A typical mineralogical and chemical analysis of phosphate slime is as follows:

MINERALOGICAL COMPOSITION

| Carbonate-fluorapatite | 20–25% | $Ca_{10}(PO_4,CO_3)_6F_{2-3}$ |
|---|---|---|
| Quartz | 30–35% | $SiO_2$ |
| Montmorillonite | 20–25% | $(Mg,Ca)O.Al_2O_3.5SiO_2.nH_2O$ |
| Attapulgite | 5–10% | $(Mg,Al)_5Si_8O_{22}(OH)_4.4H_2O$ |
| Wavellite | 4–6% | $Al_3(OH)_3(PO_4)_2.5H_2O$ |
| Feldspar | 2–3% | $KAlSi_3O_8 + NaAlSi_3O_8$ |
| Heavy Minerals | 2–3% | Zircon, Garnet, Ilmenite, Rutile |
| Dolomite | 1–2% | $CaMg(CO_3)_2$ |
| Miscellaneous | 0–1% | Kaolinite, Crandallite, Hydrated Fe-oxide, organic |

CHEMICAL ANALYSIS

| $P_2O_5$ | 9–17 |
|---|---|
| $SiO_2$ | 31–46 |
| $Fe_2O_3$ | 3–7 |

-continued
MINERALOGICAL COMPOSITION

| $Al_2O_3$ | | 6–18 |
|---|---|---|
| $CaO$ | | 14–23 |
| $MgO$ | | 1–2 |
| $CO_2$ | Trace | –1 |
| F | Trace | –1 |
| Bone Phosphate of Lime | | 19–37 |
| Loss on ignition at 1000°C | | 9–16 |

The phosphate industry has tried conventional settling practices for years for dewatering slimes and they have been virtually ineffective. The volume of slimes resulting from thickening even after prolonged settling times occupies more volume than the total volume of matrix mined. This is thought to be due to the fact that the water molecules are linked in crystalline structure with both the attapulgite and montmorillonite thus creating greater volume.

Though the industry is well aware that impoundment was not a total solution to the problem, when phosphate mining was first undertaken on a large scale there was ample area in Florida to simply store the slimes in ponds or to pump them back into the mined areas. Over the years, efforts have been made to optimize the system and to obtain maximum storage of the slimes per unit of pond retention area. However, this method amounts to providing for virtually permanent storage of the slimes and this has led to the problems discussed above. Nearly all the slimes Florida produced from the beginning of the use of matrix desliming, have been stored in impounded areas. Throughout the history of the phosphate industry in Florida, the phosphate slimes were recognized as a waste problem and were considered as a nuisance.

Over the years, many things have been considered for deatering the slimes. Equipment such as hydrocyclones, hydroclassifiers, clarifiers, and other mechanical dewatering equipment was tried. Filtration and centrifuges were also tried. Electrophoretic and electro-osmotic methods for separating liquids from suspension is widely used for dewatering of clays, particularly in Europe. These processes were, however, found to be too expensive and have not to our knowledge been used in the industry. Freeze drying was also considered and while it showed promise, the current energy crisis makes this seem impractical.

Inasmuch as various types of micro-organisms were found to be in the slimes, the Bureau of Mines explored the use of micro-organisms for dewatering the phosphate slimes. The research indicated that under certain conditions, the solids in dilute slimes could be aggregated and collected with the growth of some molds. Cost and control appear to be problems here.

A great many other things have been tried including the use of dyes, selective oiling, flotation, acid leaching, ion exchange, ultrasonic irradiation, gamma ray irradiation, induced magnetic fields and electrical fields. In some cases partial dewatering took place and in several instances the rate of dewatering was improved. However, in most cases the processes were expensive or energy requirements were excessive.

The idea of flocculation or coagulation of slimes has also attracted particular attention because of the obvious advantages to be obtained by rapidly dewatering the slimes by mere addition of chemicals. Thus, useable water can be recovered, and the compacted solids may be subject to further processing or, at the least, will take up far less area as a land fill than the area covered by the slime pond. Most importantly, the useless, space-consuming, dangerous slime pond would be eliminated from the landscape.

For this reason, the patent literature reveals a number of ways to flocculate mineral slimes such as phosphate slimes. As examples reference is made to U.S. Pat. Nos. 3,680,698 to Liu (a polyelectrolyte such as polyacrylamide used either alone or in combination with gypsum as the flocculating agent in a first step); 3,763,041 and 3,761,239 to Cook (tailings used as the slime treatment); 3,725,265 to Legal (calcium hydroxide utilized to raise the pH and precipitate the slime solids); 3,346,463 to Goren (disclosing the use of polysaccharide flocculating agents); 3,020,231 to Colwell (using a polyelectrolyte such as polyethylene oxide); 2,988,504 to Maznek (using an organic clarification agent in combination with an alkali metal silicate); 2,660,303 to Haseman (which discloses using a starch material as the flocculating agent); and 2,381,514 to Phelps (utilizing a combination of caustic soda and sodium silicate to flocculate).

However, as noted in The Bureau of Mines Report of Investigations, RI 7816, 1973 entitled "Electrophoresis and Coagulation Studies of Some Florida Phosphate Slimes", many techniques can be used in the laboratory to dewater the slimes but none are well-engineered technologies that can be applied economically. Thus, the need exists for an effective, economical system to dewater mineral slimes.

A need also exists for efficient means of disposing of fly ash. Fly ash is the well known waste product from the combustion of pulverized coal. It is collected from power plant stacks by means of mechanical and/or electrostatic precipitators. The collected fly ash is often disposed of by dumping into ponds or other disposal sites. As such, the benefits from finding useful means of disposing of fly ash are apparent.

While fly ash has been suggested as a part of an aqueous waste treatment process, to our knowledge, it has not been used in connection with treating mineral slimes. That is, in Clark U.S. Pat. No. 3,338,828 there is disclosed the treatment of aqueous wastes such as sewage by the addition of a water-soluble inorganic coagulant, small amounts of electrostatically precipitated fly ash, and an organic polyelectrolyte coagulant aid. However, in a more recent Clark U.S. Pat. No. 3,388,060 it is stated that the process disclosed in his earlier patent was found to be "not universal and does not effect material removal of phosphate from the water". In this later improvement patent, therefore, Clark discloses the use of acid-treated fly ash along with a water-soluble inorganic coagulant and an organic polyelectrolyte coagulant aid. But use of an acid-treated fly ash requires that processing steps be performed on the fly ash prior to its being used as a flocculant aid. This, accordingly, discourages the use of fly ash in this manner as a further means of disposal of the fly ash itself. Thus, there remains a need also for effective, economical means of disposing of fly ash.

SUMMARY OF THE INVENTION

The present invention solves both of these problems by presenting a feasible method for dewatering mineral slimes while at the same time disposing of fly ash. The method of the present invention involves the controlled addition of first fly ash and then a polyelectrolyte to a mineral slime. By slowly mixing these ingredients into the slime, flocculation occurs and coagulated solids settle out producing a clear water layer which may be drawn off by decanting or other means.

The fly ash is added at the rate of approximately 0.2% by weight of the total slime solution to be treated. This figure represents the amount of dry fly ash to be added to a slime solution containing approximately 5% solids. Preferably, however, the dry fly ash in these quantities is slurried (with any sufficient amount of water) or otherwise conditioned so that it may be easily and thoroughly mixed with the slime and, then, the polyelectrolyte is added.

The polyelectrolyte may be any of the well known polymer materials such as polyacrylamide, polyethylene oxide, polyethyleneamine, polyvinyl aromatic sulfonates; etc., but is preferably a low anionic polyacrylamide. This material is desirably prepared in a 0.002% concentration and is added in this form at the rate of approximately 10–25% by weight of the slimes solution when treating an approximately 5% solids slime. Slimes having less than 5% solids may be treated in a like manner since the additives, which are adequate to coagulate a 5% solids slime, will also coagulate the lesser solids content slimes, although, use of smaller amounts of fly ash and polyelectrolyte in these situations is also a possibility. Slimes having greater than a 5% solids content should be diluted with make-up water to this approximate percentage for treatment. Using a more dilute polymer or a larger amount of polyelectrolyte, obviously, has the same effect.

In practice, adjustment of the slimes to an approximately 5% solids content may be easily done since it is contemplated that the slimes either directly from the processing plant or from slime ponds will generally be pumped into a mixing vessel along with the necessary amount of make-up water. The fly ash and polyelectrolyte are then added into the mixing vessel, although, in situ treatment of slime materials in settling basins or ponds is also possible (i.e., the pond itself becoming the mixing vessel). With pumping slime solutions, it is possible to use the fluid flow as the means of mixing the ingredients since introduction of the fly ash solution and polyelectrolyte solution will cause mixing with the flowing slime solution.

Thus, it is required that the mixing be done sufficiently to result in a thorough dispersion of fly ash and polyelectrolyte throughout the slime, while at the same time not being so harsh that the coagulated particles formed are broken into fines which will not settle out. It is also important that the fly ash be added and blended into the slime before addition of the polyelectrolyte since addition in the reverse order results in a lesser degree of coagulation with some fines and fly ash residue remaining. It is believed that the reason for this is that the fine fly ash particles, when added to the slime, naturally tend to agglomerate with the finest particles in the slime. These agglomerated particles are then effectively coagulated by the polyelectrolyte. Without the fly ash or with fly ash addition after polyelectrolyte addition, the ultrafine particles in the slime are not flocculated except upon the addition of large, uneconomical amounts of polyelectrolyte.

Fly ash as collected by the precipitators at coal burning power plants may be used in the present process either in dry or aqueous slurry form (the preparation of an aqueous slurry is preferred since it facilitates easier mixing with the slime). As mentioned previously, fly ash is often dumped into ponds as a waste disposal means. This previously disposed of fly ash, termed pond ash, may also be used in the present process. Thus not only is the pond ash put to use but also the land of the fly ash disposal site may be reclaimed to some extent. In fact, pond ash may under some circumstances be preferred since it has a higher moisture content and a higher carbon content. The former characteristic may be important in terms of shipping in open transports and in putting the fly ash into slurry form. The latter characteristic is believed to aid in the polymer chain formation of the polyelectrolyte.

Fly ash and polyelectrolyte are the only essential ingredients needed for coagulation of the mineral slime. Fly ash is, as mentioned, a waste product and polyelectrolytes in the amounts and concentrations described is relatively inexpensive making the present invention economically very attractive. Addition of other ingredients, such as inorganic coagulants, is not required and will only increase the cost of the treatment process. Still, it has been discovered that small amounts of such added materials do not hinder the dewatering process. On the other hand, they do not aid in the coagulation and may in larger amounts have a deleterious effect. Thus, it is possible with the controlled addition of fly ash and small amounts of a dilute polyelectrolyte to effectively and economically dewater mineral slimes.

Accordingly, it is an object of the present invention to provide an effective method of dewatering mineral slimes by the addition of first fly ash and then a polyelectrolyte to the slime.

It is another object of the present invention to provide a method of dewatering mineral slime wherein the slime at a fixed solids concentration is pumped into a mixing vessel for gentle but thorough blending with fly ash and a polyelectrolyte, with separation of the resulting coagulated solids from the clear water taking place in settling tanks and/or holding ponds.

Other objects and advantages of the invention will be apparent from the following description, the accompanying drawings and the appended claims.

BRIEF DESCRIPTION OF THE DRAWINGS

FIG. 1 is a flow diagram of the preferred method of the present invention;

FIG. 2 is a top plan view of a mixing vessel for use in the preferred method; and FIG. 3 is a diagrammatic side view of the mixing vessel of FIG. 2, showing also a settling tank which may be used in conjunction therewith.

DESCRIPTION OF THE PREFERRED EMBODIMENT

Referring to FIG. 1, which illustrates in flow diagram form a preferred embodiment of the present invention, there is shown diagrammatically a dredge 10 (or series of dredges) located in an existing mineral slime pond. The purpose of dredge 10 is to pump the slime into mixing vessel 12. Obviously, if slimes directly from the processing plant are to be used these could be sent straight to the mixing vessel 12, although, if it is desired to delay treatment, it is also possible to use temporary holding ponds or tanks to store current slime production until scheduled for pumping into mixing vessel 12 for treatment by the present process.

The dredge 10 may be of the type having horizontally mounted augers to meter materials evenly into the suction head. Preferably, dredge 10 is equipped with monitoring equipment so that at all times a constant rate of feed can be pumped to mixing vessel 12. At the same time, either on a batch basis or continuously, the solids content of the slime is determined. While most recently created slime ponds in the phosphate industry and all current phosphate slime production is approximately at the 5% solids level, it may be necessary in pumping from older ponds or in other industries to adjust the slime solids content down to approximately 5% by the addition of make-up water as necessary. This is indicated at line 14 of FIG. 1 and in FIG. 2 by addition of make-up water to the same line 34 which is used to introduce the slimes into mixing vessel 12.

As shown in FIG. 2, slime solution from line 34 enters mixing vessel 12 tangentially in a clockwise direction. A clockwise flow of fluids is preferred due to the fact that gravity flow in the Northern Hemisphere proceeds in that direction resulting in good distribution of the additives and promoting better settlement of the coagulated solids that form. However, it should be apparent that counterclockwise mixing may also be used.

At the point of introduction a fly ash slurry from line 36 is added to the flowing slimes solution. The fly ash is added at the rate of 0.2% dry fly ash by weight of the total slime solution for an approximately 5% or less solids content slime solution. As mentioned because of the fluid flows, intermixing of the two solutions is readily achieved as the fluids flow concentrically clockwise (indicated by directional arrows) around trough 38 of mixing vessel 12.

Referring again to FIG. 1, fly ash is shown being delivered by rail at load-out 16, where it is taken by truck 18 to storage bin 20 at the site of the slime dewatering operation. As mentioned previously this may be dry fly ash as collected or may be pond ash of a higher moisture content. Belt feeder 22 is then used to transport the metered amounts of fly ash directly to the mixing vessel 21 or to an area where it is put into aqueous slurry prior to introduction into the mixing vessel 12.

In the Florida phosphate industry, delivery of fly ash from out of state is necessitated by the fact that the power plants in Florida do not burn coal and, thus, do not collect fly ash. In other areas and with other industries shipping requirements may not be as severe. Even still, fly ash and pond ash are readily available in large quantities for shipment into Florida from Georgia and for that reason such an arrangement is illustrated in FIG. 1.

As shown in FIG. 1, the polyelectrolyte is introduced from station 32 where it has been put into solution at the appropriate concentration (preferably 0.002%). For an approximately 5% or less solids content slime, the amount of 0.002% polyelectrolyte solution added is in the range of 10–25% by weight of the total slime solution being treated. In FIG. 2, the polyelectrolyte introduction point is illustrated at 42 where, after the fly ash has been thoroughly blended with the slime, the polyelectrolyte is introduced. Again gentle but thorough mixing takes place due to the fluid flow of the slime in trough 38 and the fluid flow of the introduced polyelectrolyte solution.

It should be emphasized that the mixing vessel 12 illustrated in FIG. 2 and FIG. 3 (where like reference numerals have been used), is only a preferred means of obtaining the required mixing of the additives and the fly ash. Any other means may be used as long as it results in a thorough mixing without undue agitation which might cause shearing of the agglomerated particles which form on coagulation. Thus, a standard primary clarifier with a slow moving rake for mixing could be used, or as illustrated as an optional feature in FIG. 1, compressed air may be used as the mixing force.

The admixed slime, fly ash, and polyelectrolyte is discharged from mixing vessel 12 either directly into a holding pond 26 or into such a pond through an intermediary stop at settling tank 24. In FIGS. 2 and 3, the discharging means illustrated for mixing vessel 12 is a weir overflow 40. When a settling tank 24 is used, the clear water supernatant may be partially drawn off through line 25 as the coagulated solids begin to settle and separation of liquids and solids takes place (see FIGS. 1 and 3).

The coagulation takes place within minutes after introduction of the fly ash and polymer and some settling takes place shortly thereafter. Still, with the additives used in the amounts designated, the solids content of the coagulated material in settling tank 24 is at most only around 20–30% as compared to 40% solids for a solid cake. At this 20–30% solids level a viscous paste is formed which may be easily discharged into holding pond 26.

In holding pond 26 clear water is drawn off by pump 28 and is either sent to the processing plant to serve the water needs there or part may be recycled through lines 14 and 30 to serve as make-up water for the slimes and solution water for the polyelectrolyte, respectively. Part of this water may also be used to put the fly ash into slurry form if that is desired.

Also in holding pond 26 additional settling of the coagulated solids takes place. With a resultant 20–30% solids content, this represents a workable material which can be subjected to further processing to obtain valuable phosphate minerals, which can be mechanically or thermally dewatered further and the filter cake used for fertilizer or some other useful purpose, or which can be used as a land fill since it will support sand and/or earth. If holding pond 26 has a sandy bottom in particular, loading over with a surfacing material is effective since the pressure completes the dewatering of the coagulated materials by displacing the water such as through the sandy bottom and the resultant land fill is a solid, tillable piece of land.

The 20–30% solids coagulated material obtained by the present invention is to be distinguished from mineral slimes which have attained that level of solids concentration merely on aging. The concentrated slimes still represent a colloidal-type suspension which cannot be easily dewatered; whereas, the coagulated solids of the present invention may be easily treated further by any number of means to complete dewatering if that is desired. In addition, such materials can be easily moved with conventional earth moving equipment with some additional drying.

It has also been found that the coagulation process of the instant invention produces clear fresh water with little effect, if any, on the quality of the resulting water. There is little pH change of the type that occurs on the addition of many inorganic coagulant acids, nor is there any toxic effect imparted to the water by this process.

Example

A 250 ml sample of phosphate slime determined to have a solids content of about 5% was placed in thirteen test beakers. Various known coagulating agents were added as indicated in the following table with the results as also indicated. The addition of ingredients was in the order indicated with slow clockwise stirring for 20 minutes in each instance. As indicated in Table I observations were made immediately after mixing and after overnight (12 hours) settling.

Table I

| Runs | 1 | 2 | 3a | 3b | 3c | 4a | 4b | 4c | 4d | 5a | 5b | 5c | 5d |
|---|---|---|---|---|---|---|---|---|---|---|---|---|---|
| Phosphate Slime 5% | 250ml | 250ml | 250ml | 250ml | 250ml | 250ml | 250ml | 250ml | 250ml | 250ml | 250ml | 250ml | 250ml |
| Pond Ash | .5gm | 0 | .5gm | .1gm | 1gm | .5gm | .5gm | .5gm | .5gm | .5gm | .5gm | .5gm | .5gm |
| Polymer* | 0 | 25ml | 25ml | 25ml | 25ml | 5ml | 25ml | 50ml | 100ml | 25ml | 25ml | 25ml | 25ml |
| 1% $Al_2(SO_4)_3$ | — | — | — | — | — | — | — | — | — | 10ml | — | — | 10ml |
| 1% CaO Sol. | — | — | — | — | — | — | — | — | — | — | — | 10ml | 10ml |
| 1% $FeCl_3$ Sol. | — | — | — | — | — | — | — | — | — | — | 10ml | — | 10ml |
| Floc.Level Overnight | None | 240ml | 175ml | 175ml | 175ml | 240ml | 175ml | 150ml | 150ml | 225ml | 225ml | 200ml | 225ml |
| 12 Hr. Floc. Level | Slight | 240ml | 150ml | 175ml | 160ml | 200ml | 150ml | 150ml | 150ml | 200ml | 200ml | 200ml | 200ml |
| Type Floc. | None | V.Fine | Med. Clear | Fine | Fine | Poor | Med. | Coarse | Coarse | Fine | Fine | Coarse | Fine |
| Supernatant | Cloudy | Cloudy | Clear | Cloudy | Clear | Cloudy | Clear | Clear | Clear | Cloudy | Cloudy | Cloudy | Cloudy |
| Surface Scum | — | — | None | Nil | None | Slight | None | None | None | Slight | None | Slight | None |

Miscellaneous: Run 3b shows separation of slime layer
*.002% low anionic acrylamide-base copolymer polyelectrolyte sold under the trademark HERCOFLOC 818.2 By Hercules Incorporated, Wilmington, Delaware.

In the results of Table I, the lower the (ml) figure for floc formation, the more condensed and settled the coagulated solids. Thus, the floc formation results show that the optimums are achieved when approximately 0.2% fly ash is added along with 10–25% of the 0.002% polyelectrolyte solution (Runs 3a and 4b–4c). When only fly ash is used no coagulation occurs (Run 1). When only polyelectrolyte is used slight, very fine coagulation occurs, but a clear supernatant is not obtained (Run 2). However, when used together good sedimentation occurs and a clear supernatant is obtained which may be easily decanted (Runs 3a and 4b–4c). In Table I, the larger the floc formation the better. Thus, it was observed in the optimums that the sediment is an agglomeration of spongy particles of medium or coarse size (Runs 3a and 4b–4c). Once locked into such agglomerated masses, the sediment bounces around in the solution in various sizes rather than being in a finely divided particulate form; although, severe agitation will result in breaking the polymer chains and reconstitute the colloidal suspension. The sediment solids were filtered and/or dried in an oven, forming a filter cake which could be packed, leveled, and otherwise handled.

When appreciably less than 0.2% fly ash is used, there is an insufficient number of fly ash particles to agglomerate with all of the ultrafine solid particles in the slime. On adding the polymer, then, while some coagulation takes place, not all of the solids will be removed and separation of the slime layers was noted (Run 3b). On the other hand, when a significantly greater amount of fly ash is added, there is more than enough fly ash particles to join with the ultrafine slime solids (Run 3c). This leaves unattached fly ash particles in the suspension which either compete with the slime solids on coagulation or require extra amounts of polyelectrolyte for their removal; thus, resulting in a lesser desired process in terms of flocculation results and economics involved.

The above explanation of the function of the fly ash is only a hypothesis, but it seems to be borne out by the results of the example. Similarly it is hypothesized that the polyelectrolyte functions by forming long molecular chains which entrap or otherwise chemically or mechanically capture the suspended solids. If too little polyelectrolyte is used, there is insufficient chain formation to remove all of the solids (Run 4a). While over 25% of a 0.002% polyelectrolyte may be used, it does not add to the effectiveness of the treatment (Run 4d). Rather, it may detract from the engineering aspects of the process since greater amounts and greater concentrations are not as easily blended into the slime solution. In addition, it should be apparent that using greater amounts of polyelectrolyte when not required is uneconomical.

Also the addition of inorganic coagulants of the type known in the art do not aid in the process, but rather in some instances give poorer results (Runs 5a–5d). For this reason, it is believed that a means of dewatering mineral slimes is presented which is superior to previous suggested means in terms of results, the ability to easily engineer the process into the use situations as previously discussed, and the economics involved.

Runs such as those shown in the example above were also performed on laboratory samples of quarry slime from granite washings obtained from the Georgia Marble Company. The results obtained were equally as good with coagulation taking place rapidly, and a spongy agglomerated sediment was formed along with a clear supernatant which was easily drawn off by decanting.

While the method herein described constitutes a preferred embodiment of the invention, it is to be understood that the invention is not limited to this precise method, and that changes may be made therein without departing from the scope of the invention.

What is claimed is:

1. A method of dewatering about 5% phosphate slimes comprising adding ingredients consisting essentially of fly ash slurry and a low anionic polyacrylamide solution to said slime in the following manner:

a. adding the fly ash slurry to the slime to be treated at a rate of approximately 0.2% by weight of total slime solution and thoroughly and gently mixing the resulting solution, followed relatively soon thereafter by the step of
   b. adding the polyacrylamide solution to the admixed fly ash and slime solution and thoroughly and gently mixing to initiate coagulation, said polyacrylamide having a concentration of approximately 0.002% and being added at the rate of 10–25% by weight of the total slime solution,
   c. allowing the coagulated solids to settle, and
   d. drawing off clear water separated from the coagulated solids on settling.

2. A method of dewatering about 5% phosphate slimes comprising adding ingredients consisting essentially of fly ash slurry and a low anionic polyacrylamide solution to said slime in the following manner:

a. measuring the solids content of the slime to be treated,
   b. adjusting the slime content to approximately 5% or less solids by addition of make-up water as necessary to form a slime solution,
   c. pumping said slime solution into a mixing vessel so that said solution flows circularly in a clockwise direction,
   d. adding approximately 0.2% fly ash by weight of the total slime solution, said fly ash being in an aqueous slurry,
   e. gently and thoroughly mixing said fly ash into said slime solution,
   f. relatively soon thereafter adding approximately 10–25% by weight of the total slime solution of a low anionic polyacrylamide in aqueous solution at a 0.002% concentration,
   g. gently and thoroughly mixing said polyacrylamide into said slime solution and fly ash solution mixture to initiate coagulation,
   h. discharging said mixed solutions from said mixing vessel into a settling tank,
   i. allowing the coagulated solids to settle,
   j. discharging the coagulated solids into a holding pond for further processing, and
   k. drawing off clear water.

3. The method of claim 2 wherein said steps take place continuously.

4. The method of claim 3 wherein a portion of said clear water drawn off is recirculated as said make-up water for preparation of said slime solution.

* * * * *